(No Model.)
B. JENNINGS.
INSULATOR AND HOLDER FOR ELECTRIC RAILWAYS.
No. 402,836.  Patented May 7, 1889.
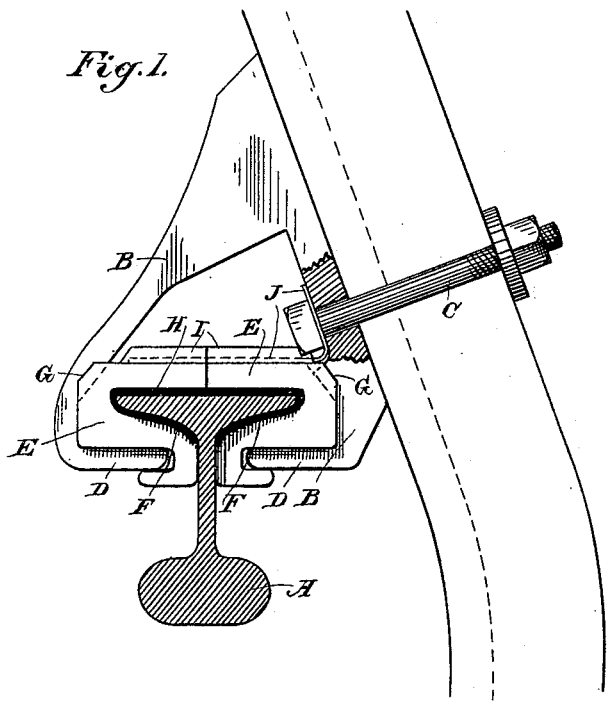
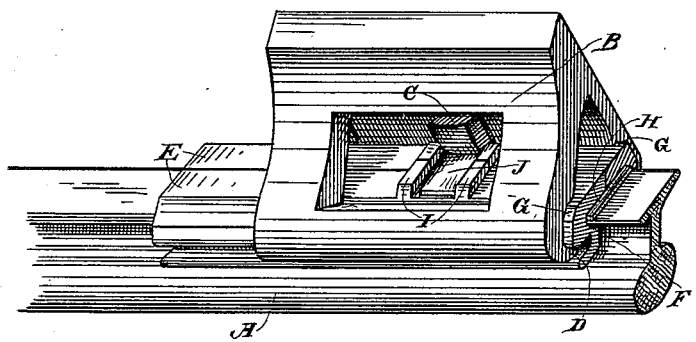
Witnesses,
Geo. H. Strong.
J. H. Rouse
Inventor,
Byron Jennings,
By Dewey & Co.
atty

UNITED STATES PATENT OFFICE.

BYRON JENNINGS, OF SAN JOSÉ, CALIFORNIA.

INSULATOR AND HOLDER FOR ELECTRIC RAILWAYS.

SPECIFICATION forming part of Letters Patent No. 402,836, dated May 7, 1889.

Application filed February 1, 1889. Serial No. 298,387. (No model.)

*To all whom it may concern:*

Be it known that I, BYRON JENNINGS, of San José, Santa Clara county, State of California, have invented an Improvement in Insulators and Holders for Electric Railways; and I hereby declare the following to be a full, clear, and exact description of the same.

My invention relates to an insulator for the rails of conduit electric railways, the hood, and the insultor by which the rail is suspended and insulated from contact with other conductors.

Referring to the accompanying drawings for a more complete explanation of my invention, Figure 1 is an end view of the device. Fig. 2 is a perspective view.

My invention is especially designed to provide an insulator within which the electric conducting-rails of a conduit electric railway are retained, and by which they are insulated from contact with their supports or other conductors.

It also has for its object to retain the insulators within the hood in which they are held and prevent them from being drawn out of place by the expansion and contraction of the rails.

A is the electric conducting-rail, in contact with which the wheels of a trolley (which conveys the electric current to the motor on the car) are caused to travel. As these rails serve to conduct the current of electricity throughout the length of the conduit, it is important that they should be properly insulated from the surrounding metal, and this is done by securing them in glass insulators which are fixed in hoods or supporting-chairs attached at intervals to the yokes within the conduit. At present the rail is secured within the glass insulator by means of wire, which passes around the insulator and the rail, but the expansion and contraction of the rail is apt to draw the insulator out of its supporting hood or yoke, and the constant movement and vibration of the glass within the iron, caused by the passage of the trolley-wheels over the rail, soon breaks off the projecting shoulders of the glass and causes it to fall out of its supporting-hood, rendering it useless.

In my invention, B is the "hood" (so called) in which the insulating material is fixed. This hood is made of cast-iron, of such shape as to fit against the sides of the yoke-irons within the conduit, and is secured thereto by means of the bolt C, passing through one side of the hood and through the yoke-iron, a nut upon the other end of the bolt serving to hold it in place.

D are inwardly-turned flanges at the bottom of the hood, and E E are the insulators, which are made of glass or any suitable non-conducting material. This insulator I make in two pieces separated longitudinally, each one having a slot or channel, F, made in it to receive the flange of the rail A and retain it between the two parts of the insulators, which fit the inside of the hood, so as to slide in from one end and clasp the rail. At one end of these insulators is formed a raised lug, G, which arrests the insulator when it has been pushed into the hood and prevents it from moving any further in the direction toward which it is introduced, the lugs abutting against the end of the hood.

In order to relieve the insulator from the jar and strain of the rail, the channels into which the rail-flange enters are made enough larger than the flange to admit the introduction of a rubber or other elastic buffer, H, which fits into the channel surrounding the rail-flange and the web also, if desired, so as to prevent actual contact between the iron and the insulator, and relieve the latter from shocks due to the passage of the trolley over the rails.

In order to retain the insulators in place within the hood and prevent them from being drawn out, these insulators are formed with raised projections I, which extend across them transversely upon each side of the middle, as shown, and the washer beneath the bolt C, by which the hood is secured to the yoke-irons of the conduit, is provided with an extension or plate, J, which, when the bolt is in place, lies between the upwardly-projecting lugs I, and thus prevents the insulator from moving in either direction; but, if preferred, only one of these lugs need be formed on the insulator, as the lugs G, above described, on the ends of the insulator, will serve as a check in one direction, if desired.

The hood is made with an opening upon the side opposite to the one through which the bolt passes for the convenient introduction and removal of the bolt. The lugs I are separated to form a space a little wider than the width of the plate J, which lies between them, so that the insulator may be moved back and forth a little within the hood to show whether the rail lies freely within the insulator, or whether it is caused to bind by reason of the hood being attached to the yoke, so as to give it a twist. If the latter should be the case, and the insulator not move freely, it would be necessary to introduce a strip between the yoke and the hood, until the latter is properly secured with relation to the rail and the insulator.

As the atmospheric heating and cooling of the rails A cause them to move in one direction or the other, it will be seen that by reason of the shoulders upon the insulators and the stop or plate J the insulators will be prevented from crawling or moving out of the hood, and the rail moves freely enough within the insulator so that it can move without any strain which would tend to break the insulator.

Having thus described my invention, what I claim as new, and desire to secure by Letters Patent, is—

1. The hood formed to fit against the yokes or supports to which it is attached, having a channel or opening longitudinally through it, with inwardly-turned flanges at the bottom, in combination with the channeled two-part insulators having the lugs or stops G at one end, substantially as described.

2. The hood channeled longitudinally and having the inwardly-turned flanges, the two-part insulators fitting within said channel and having the grooves adapted to clasp the flange of the rail, which is held by them, and lugs I, formed transversely upon the top of the insulators, in combination with the bolt passing through the side of the hood and the plate which lies between the lugs upon the insulators, substantially as described.

3. The hood having one side adapted to fit against the yokes or supports to which it is bolted, a longitudinal channel through the hood having inwardly-turned flanges at the bottom, the two-part insulators fitting said channels and having grooves in their adjacent faces, into which the flange of the rail fits, and the intermediate elastic lining fitted into the channels between the rail and the insulator, the transverse lugs I upon the top of the insulator, and the bolt, with an extension or plate which lies between these lugs when the bolt is in place to secure the hood to the yoke, substantially as described.

In witness whereof I have hereunto set my hand.

BYRON JENNINGS.

Witnesses:
S. H. NOURSE,
H. C. LEE.